3,095,222
JOINT HAVING SET SCREW WITH NON-MARRING GROOVED ENGAGING FACE
Gilbert E. Davies and Gino L. Gasparini, Fort Wayne, Ind., assignors to Superior Ball Joint Corporation, Fort Wayne, Ind.
Filed Aug. 31, 1959, Ser. No. 837,163
1 Claim. (Cl. 287—52.08)

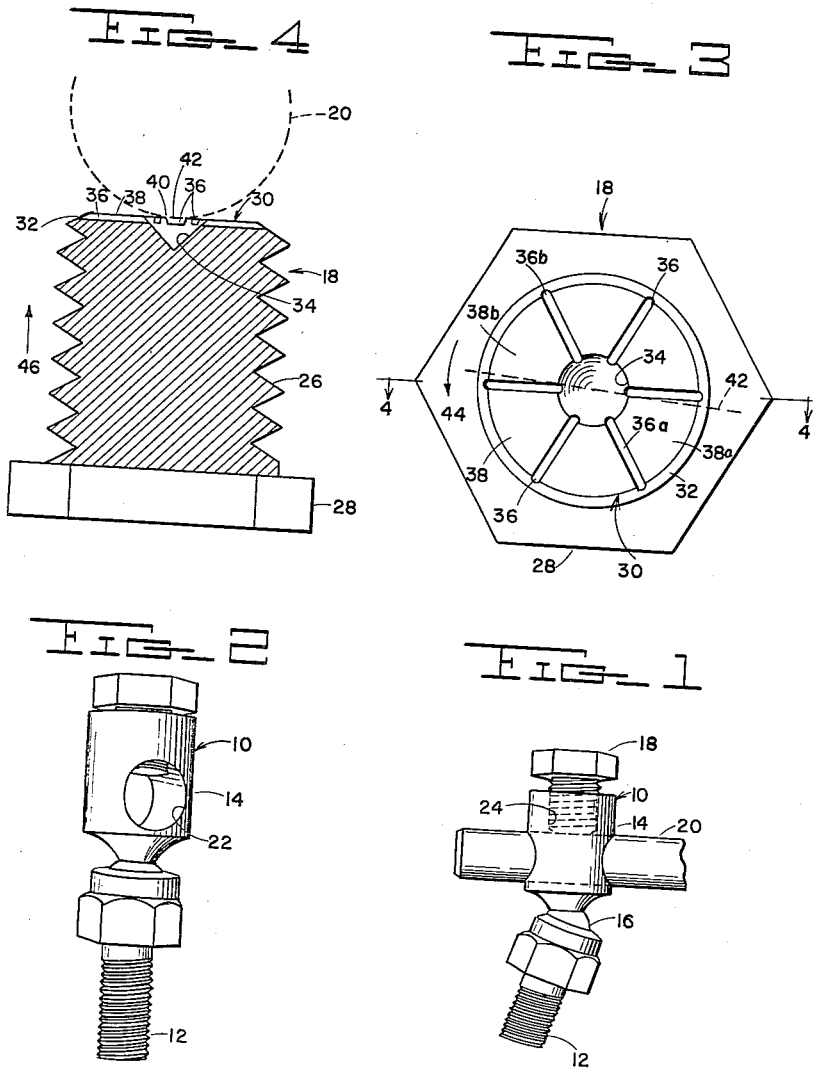

The present invention relates to a locking-screw device, and more particularly to a self-locking device uniquely adapted to secure two parts of a mechanism together.

Self-locking set screws are of many different shapes and designs, the most common design having a threaded shank formed with a point on the end which seats or penetrates into the part being fastened. Other set screws are provided with tips which are cup-shaped, knurled, sharply serrated or the like whereby the tip will dig or bite into the piece being fastened to prevent the latter from being accidentally loosened or dislodged. All of these prior set screws have one feature in common, this being the provision of a tip capable of biting positively into a part to an extent that the surface of the part is appreciably indented or scored. The pointed set screw obviously produces an indentation corresponding to a socket or recess. The cup-shaped set screw produces an annular indentation. Both of these indentations prevent the part from moving relative to the set screw, since the set screw in effect becomes integrated with the part.

In securing a rod or shaft in place, it sometimes becomes necessary to make incremental longitudinal or rotational adjustments of the same with respect to the set screw. When these incremental adjustments correspond to only a small fraction of an inch in the usual instance, the indentation already formed in the workpiece or part is not removed sufficiently far from the tip of the set screw to enable the latter to take a new and independent bite into the workpiece. Instead, the tip as it is being forced into the workpiece tends to traverse into the old indentation, thereby locking the workpiece in the same position it was in previously. Thus, the making of relatively small incremental adjustments becomes either impossible or quite difficult.

Coupled with this difficulty is the fact that these prior set screws tend to loosen when subjected to vibration. In order to prevent this loosening, it is either necessary to back up the set screw with another set screw or provide some locking means for preventing the set screw from unscrewing.

The present invention overcomes these prior art difficulties by providing detent means which inherently lock the set screw against counter rotation while simultaneously locking the rod or shaft into position without mutilating the same to an extent which will prevent the making of relatively small incremental adjustments.

It is an object of this invention to provide a locking device of the set screw type which will not accidentally loosen from the effects of vibration but provides a secure locking action as will permit the making of relatively small incremental adjustments.

It is another object of this invention to provide a locking screw having a uniquely shaped tip which functions as a detent for locking a rod, shaft or the like in place.

Other objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claim is not violated.

In the drawings:

FIG. 1 is an illustration of an embodiment of this invention wherein two parts are securely assembled together;

FIG. 2 is an illustration of a ball joint which uses a locking screw of this invention;

FIG. 3 is a bottom end view of the locking screw; and

FIG. 4 is a sectional illustration of the locking screw taken substantially along section line 4—4 of FIG. 3 and showing its locking engagement with a rod.

Referring to the drawings, the ball joint indicated by the reference numeral 10 is of conventional construction and comprises an externally threaded base 12, a head 14, a ball and socket joint 16, a locking screw 18, and a rod 20 which is secured to the head 14 by means of the screw 18. The rod 20 is received by a transverse hole 22 through the body 14, the diameter of this hole being slightly larger than the diameter of the rod 20 to provide for a slip-fit. The locking screw 18 is threadedly received by a bore 24 in the body 14, the axis of this bore being at right angles to the axis of the hole 22. This positions the locking screw 18 to bear against the periphery of the rod 20 for securing the latter in place.

The locking screw 18 is shown in more detail in FIGS. 3 and 4. It comprises shank 26 having an external thread, as shown, formed thereon, and a head 28 of hexagonal shape. The opposite end face or rod-engaging portion 30 of the shank is substantially flat as shown, the area of this portion being substantially the same as the cross-sectional area of the shank. This portion 30 is slightly tapered at 32 to merge with the threads.

The central portion of the end face is formed with a conically shaped indentation 34, the size of this indentation being quite small in comparison with the diameter of the end face 30.

A plurality of diametral detent grooves 36 are provided in the end face and are spaced angularly equal distances apart. In the embodiment of FIG. 3, there are six such diametral grooves spaced apart by an angle of 60°. Each of the grooves 36 are of uniform width throughout the length thereof and are relatively shallow; substantially smooth land portions 36 are disposed between adjacent grooves. As the figures show, the grooves extend through the peripheral edge of the end face and are normal to the shank axis.

In use, and referring to FIGS. 1 and 4, the lock screw 18 is turned downwardly against the rod 20 after the latter is inserted into the hole 22. As the screw is threaded forcefully against the rod 20, the operator feels the detent movement of the diametral grooves 36 over the rod periphery. When the screw 18 has been turned downwardly with a given torque, the final operation is to turn the screw just sufficiently to cause one of the detent grooves 36 to engage the contiguous axial surface portion 42 of the rod which thereby projects slightly into the groove, as shown in FIG. 4. The rod is thereby forcefully secured in place and the set screw is permanently locked against loosening. This locking action occurs by reason of the fact that the groove sides or edges, as indicated by the numeral 40 in FIG. 4, serve as abutments which are engaged by the rod 20 periphery, this engagement resisting turning action of the screw.

Since the end face 30 of the screw is substantially flat and contains no sharp edges or points, forceful turning of the screw against the rod 20 does not mutilate the rod surface or result in any appreciable piercing of the set screw into the rod surface. Instead, the end face and the diametral grooves 36 frictionally engage the rod with such force that the latter is firmly secured in place. If it is desired to adjust the rod longitudinally a small fraction of an inch, it is only necessary to loosen the screw 18, adjust the rod 20 to the new position and then tighten the screw in this new position.

It will be readily seen that the locking of the rod 20 and the screw 18 to restrain rod 20 against axial movement and screw 18 against turning (and thus loosening) is provided by the detent action of grooves 36 with the axial surface portion 42 of the rod. When screw 18 is turned downwardly, as in the direction shown by arrows 44, 46, toward rod 20, a diametral pair of flat land portions such as 38a, 38b initially engage surface portion 42 of the rod and further turning of the screw 18 then causes the next diametral pair of grooves 36a, 36b to snap into locking engagement with the surface of the rod; the axial advance of the screw in the direction 46 from the point when the land portions 38a, 38b first engaged surface 42 of rod 20 until engagement of the grooves 36a, 36b with the rod is accommodated primarily by deformation of screw threads 26 and the complementary threads in the bore 24 of the body 14.

It will further be understood that there is a relationship between the pitch of threads 26 of the screw 18 and the number of grooves 36. Thus it will be seen that if the threads 26 were made twice as coarse as that shown in FIG. 4, the axial advance 46 of screw 18 in response to the same incremental rotation of the screw would be twice as great. Therefore, rotation of the screw 18 by an amount sufficient to move the same from the point of first engagement of a diametral pair of land portions 38 with the surface of the rod 20 to engagement of the next diametral pair of grooves 36 therewith would be accompanied by twice the axial advance of screw 18 as that provided in the embodiment shown in FIG. 4. If the deformation of the screw threads 26 would not accommodate this increased axial advance of the screw 18 so that it would be impossible to rotate the screw sufficiently to cause engagement of a diametral pair of detent grooves with the surface of the rod, the doubled thread pitch may be compensated for by doubling the number of grooves 36, i.e., twelve, thus restoring the original relationship of the angular spacing of the grooves to the axial advance of the screw responsive to rotation through such an angle. It is thus seen that the angle defined between adjacent grooves 36 must be proportioned, for the pitch of the thread 26, so that the screw can be rotated through that angle after initial engagement of a diametral pair of land portions with the rod in order to insure engagement of the next diametral pair of grooves with the rod; in the illustrated embodiment, the 60° angle between the grooves 36 provides the necessary rotation of screw 18 for the thread pitch shown.

While this invention has been illustrated as being useful in combination with a ball and socket joint, it will occur as obvious to persons skilled in the art that the invention is susceptible of uses in other assemblies wherever lock screws are needed.

Preferably, the locking screw 18 is cold formed of steel and is thereafter case hardened; however, it will appear as obvious to a person skilled in the art that the screw may be formed by other well known techniques and of other materials.

What is claimed is:

In combination: a locking device comprising a body having a first cylindrical bore therethrough, said body having a second bore which is threaded and which opens into said first bore, said first and second bores being at right angles to each other, and a locking screw having a solid shank having a thread of given pitch formed thereon, said shank being threadedly received in said second bore, said shank having a flat extended area work-engaging end face, said end face lying in a plane normal to the axis of said shank, said end face having a central indentation formed therein having a diameter substantially smaller than the diameter of said end face, said end face having at least three pairs of equally angularly spaced diametral detent grooves formed therein extending radially outwardly from said indentation and through the peripheral edge of said end face, each of said grooves being narrow and shallow with respect to the diameter of said end face and of uniform width throughout its length and defining with adjacent grooves substantially flat land portions having no sharp edges or points; and a cylindrical rod received by said first bore, said screw being movable axially in said second bore forcefully to engage one diametral pair of grooves with an axial portion of the peripheral surface of said rod, said surface portion projecting slightly into said one groove with the groove sides engaging said surface portion thereby locking said rod in said first bore and locking said screw against loosening without mutilation of said surface portion of said rod, the pitch of the thread and the angle defined between adjacent grooves being such that said screw is rotatable in a direction to tighten said screw on said rod through said angle after initial engagement of a diametral pair of said land portions with said axial surface portion of said rod thereby to cause engagement only of the next diametral pair of grooves with said surface, under normal torque loads applied to said locking screw.

References Cited in the file of this patent

UNITED STATES PATENTS

| | | |
|---|---|---|
| 844,750 | Rieschick | Feb. 19, 1907 |
| 1,064,527 | Norris | June 10, 1913 |
| 1,160,932 | Mendelson | Nov. 16, 1915 |
| 1,438,648 | Jacobs | Dec. 12, 1922 |
| 1,940,878 | Olson | Dec. 26, 1933 |
| 2,096,040 | Hosking | Oct. 19, 1937 |
| 2,355,899 | Beede | Aug. 15, 1944 |

FOREIGN PATENTS

| | | |
|---|---|---|
| 6,146 | Great Britain | Feb. 6, 1913 |
| 621,686 | France | Feb. 12, 1927 |